Sept. 7, 1926.  
A. E. GIBSON  
MEANS FOR FORMING MOLDED OBJECTS  
Original Filed Feb. 17, 1922   2 Sheets-Sheet 2
1,599,085
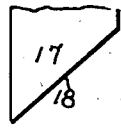
FIG. 3
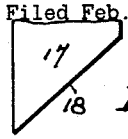
FIG. 4.
FIG. 5.
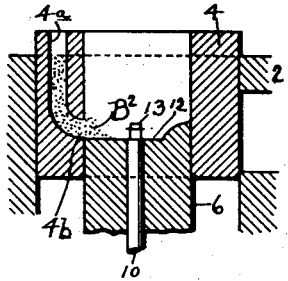
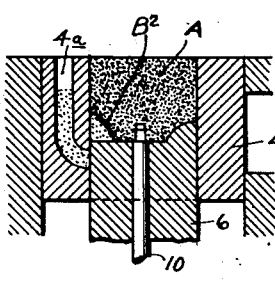
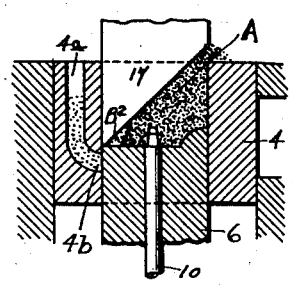
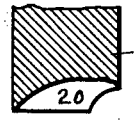
FIG. 6.
FIG. 7.
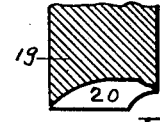
FIG. 8.
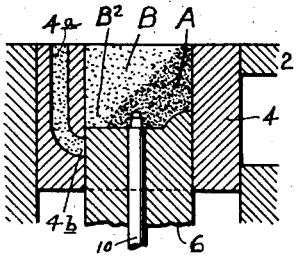
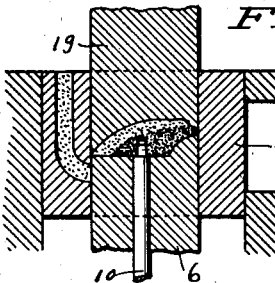
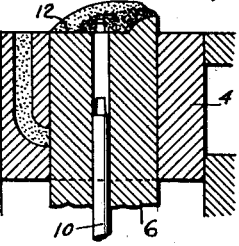
FIG. 9.
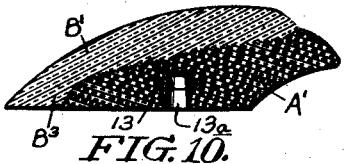
FIG. 10.
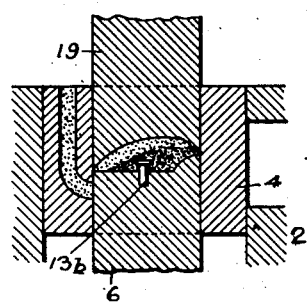
FIG. 11.
INVENTOR  
Albert E. Gibson  
BY  
ATTORNEY Patented Sept. 7, 1926.

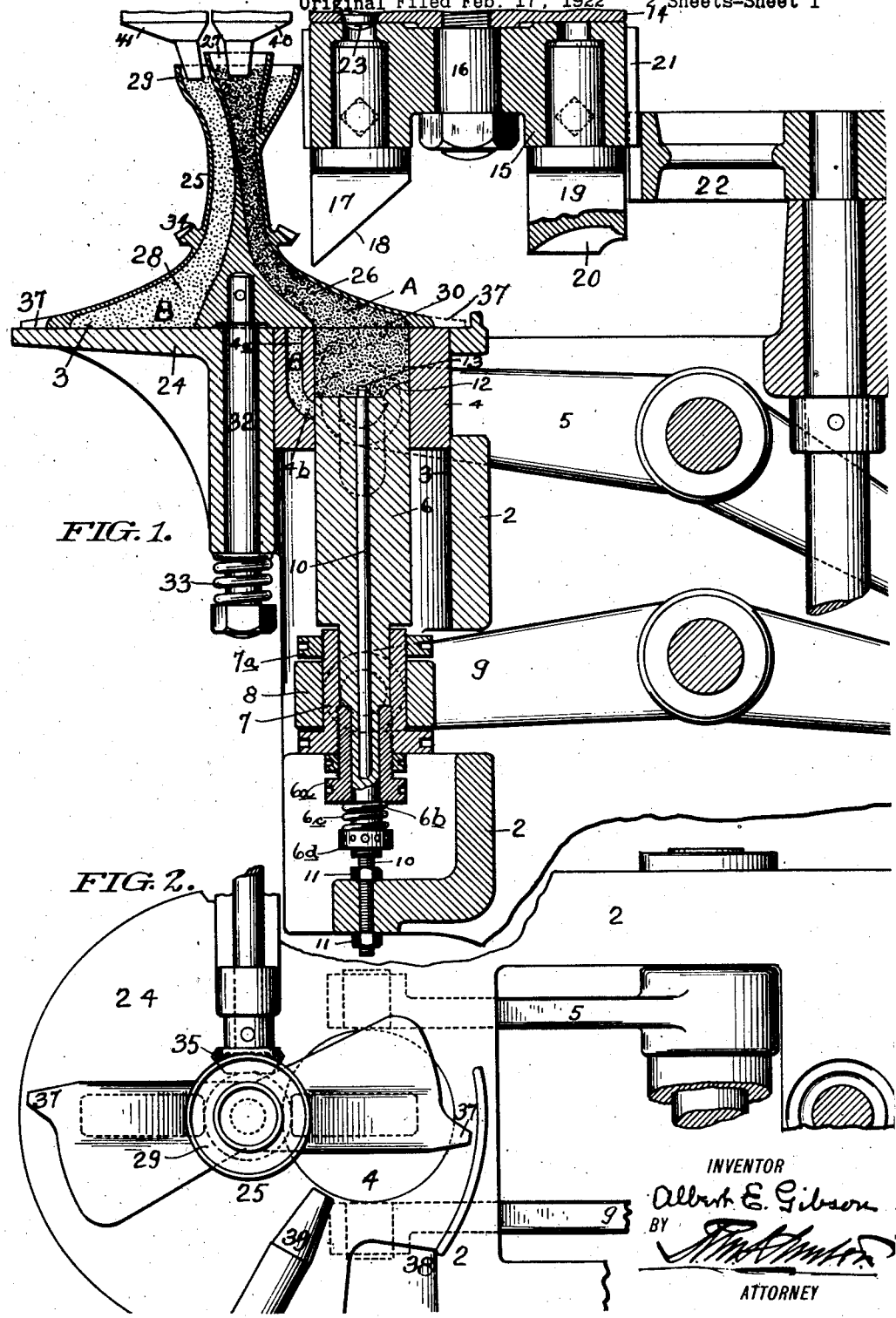

1,599,085

UNITED STATES PATENT OFFICE.

ALBERT E. GIBSON, OF PHILADELPHIA, PENNSYLVANIA, ASSIGNOR TO THE DENTISTS' SUPPLY COMPANY, A CORPORATION OF NEW YORK.

MEANS FOR FORMING MOLDED OBJECTS.

Original application filed February 17, 1922, Serial No. 537,157. Divided and this application filed May 2, 1923. Serial No. 636,066.

My invention has for its object the molding of artificial teeth and other objects in such a manner as to form them of two or more grades of material (such as of different colors) and which, when baked or vitrified, will provide a unitary object with different colors or shades blended to a greater or less degree.

My object is further to provide a suitable machine or apparatus to insure the proper assemblage or mixing of the materials from which the teeth or other objects are to be molded and for putting the same under compression in molded form preliminary to subsequent treatment such as baking or vitrifying, according to the use of the object.

This application is a division of my application Serial Number 537,157, filed February 17, 1922, in which is set out and claimed the method or process herein referred to, and which application also discloses the apparatus forming the subject matter of the present application.

Considering the subject of this invention more particularly in respect to the making of artificial teeth, it is necessary to provide a porcelain body portion of a relatively darker material than the front and incisor portions which are composed of lighter and more transparent porcelain.

Heretofore, the material composing the light and dark portions of the teeth is first prepared in a more or less pasty condition and then introduced successively by hand in the mold and subsequently pressed and baked preliminary to the final and vitrifying operation. The process, as heretofore carried on, is relatively slow and, moreover, is liable to provide more or less irregularity and dissimilarity in the shading of the teeth when they should be duplicates of each other.

By my improved means, I am enabled to mold such teeth in a rapid manner from a powdered or granular material and at the same time insure absolute uniformity in the deposition of the materials in the mold for insuring the different coloring or shading of the article.

Furthermore, by my improved means for carrying the same into effect, I am enabled to subject the material to great pressure so that the said material in granular form is so compacted that it is brought to a strong molded shape which may be readily handled without the necessity of a preliminary baking operation, as has heretofore been necessary with hand molded teeth.

With the above and other objects in view, the nature of which will be more fully understood from the description hereinafter, the invention consists in the novel construction of means for molding objects, as hereinafter more fully described and defined in the claims.

Referring to the drawings: Fig. 1 is a sectional view of the cooperative portions of a machine adapted for the practice of my improved process and embodying the structural characteristics of the preferred form of apparatus embodying my invention; Fig. 2 is a plan view of the same with the upper dies removed; Figs. 3, 4, 5, 6, 7 and 8 are vertical sectional views of the main dies and the materials operated upon for illustrating the several steps in the process; Fig. 9 is a sectional view of a modification; Fig. 10 is a sectional view of a completely molded tooth form with anchor embedded and ready for receiving the anchor pin; and Fig. 11 is a perspective view of the die structures employed in Figs. 3 to 8, inclusive.

2 is the main frame and is provided with a vertical aperture 3 in which a vertically reciprocable annular die body 4 is adapted to be vertically adjustable under the operation of an oscillating lever mechanism 5 intended to raise the body 4 to at least the position indicated in Fig. 1 or to lower the same to expose the upper part of the die 6, as may be required. The lower die member 6 is guided within the body 4 and is adjustable vertically by means of a pivoted lever structure 9. The lower portion of this die member 6 is fitted within a spool 7 having an adjustable nut 7ª at the top and a flanged lower portion, and between which flange and nut there is a loose sleeve 8 to which the lever structure 9 is hinged and by which motion is imparted to the die member 6. The lower part of the spool is provided with an adjustable abutment screw 6ª by which the die member 6 may be adjusted vertically with respect to the spool. When the spool 7 is fully down, it rests upon the part 2ª of the main frame 2, said part 2ª constituting an abutment for sustaining the die member 6 during the downward thrust of the male die member 19, to be later described. By providing the adjustable abutment screw 6ª and the adjustable nut 7ª, capacity for adjusting the position and movement of the die member 6 vertically is had to control the thickness of the article being molded, as more fully described hereinafter.

The main frame 2 is provided with a table 24 having a level corresponding to the upper surface of the body member 4 of the die structure when fully raised for die action, as indicated in Fig. 1. Rotatably supported upon this table is a mechanism 25 for feeding the materials to be molded from hoppers 40 and 41 into the space of the die member 4, as will be understood from the drawings. This mechanism 25 is secured to a vertical shaft 32 journaled in the main frame and provided at its lower end with a coil spring 33 which pulls the mechanism 25 into a snug fitting with the top of the table 24 and upper surface of the body member 4 of the die structure when raised. More specifically, this feeding mechanism 25 comprises two oppositely directed curved feeding passages 26 and 28 respectively provided at their lower ends with discharge openings 30 and 31 which are closed or sealed by the surface of the table 24 and upper surface of the body member 4, except when brought directly over the aperture in the body member 4, of the die structure, as indicated in Fig. 1. As shown, the curved passage 26 may terminate at its upper end in a hopper 27, whereas the curved passage 28 terminates in a larger annular hopper 29 surrounding the hopper 27. These hoppers 27 and 29 are respectively supplied with molding materials A and B from the containers 40 and 41 which discharge into the hoppers. The feeding mechanism 25 may be rotated by a bevel gear 35 on a driving shaft 36 meshing with a bevel gear 34 on the feeding mechanism itself.

During the operation of the machine, this feeding mechanism may be rotated continuously or intermittently, as preferred, so that it deposits within the die structure a measured amount of the material A and after the same has been adjusted by part compression, it delivers the other material B into the space thus provided within the die structure before the final compression of the two materials into the unitary body, all of which will be fully understood from a later description of the operation.

At a point above the body member 4 of the die structure is arranged any suitable form of mechanism for vertically reciprocating a pair of male die members 17 and 19, alternately. In the particular mechanism illustrated, 14 is a vertical reciprocating head which may be guided in an extension of the main frame and put into action by any of the usual mechanisms employed in stamping or die process. Pivoted to the bottom of the head 14 on a vertical stud 16 is an adjustable die carrying frame 15 having two sockets respectively upon opposite sides of the stud 16 and one of which is fitted with a shaping die 17 having a lower inclined surface 18, and the other provided with a plunger die 19 having its end surface shaped to conform to the upper part of the finished molded object. The die carrying frame or turret 15 may be rotated about the stud 16 by a gear 22 meshing with gear teeth 21 about said frame, the latter teeth being of relatively great vertical height so as to permit vertical reciprocation relatively to the operating gear 22. A spring actuated plunger 23 in the head 14 may be employed to coact with holes in the upper part of the turret frame 15 to centralize the dies 17 and 19 over the aperture in the die body 4 and over bottom die member 6, as will be understood by reference to Fig. 1.

When this invention is employed to mold artificial teeth, it is usually necessary to embed within the bisk body a platinum pin or anchor and provide a hole leading thereto from the back of the tooth and to provide these results, I employ the following devices: Extending upwardly through the lower die member 6 is a stationary rod 10, the lower end thereof being adjustably attached to the main frame 2 at 11 and at the upper end there is a slightly tapered post portion 12 which projects above the upper surface of said die member 6 and adapted to support the anchor 13, of whatever form it may be. When the anchor is to be placed on the post, the body member 4 is moved downward upon the lower die member 6 so as to expose said post 12 to permit the application of the anchor by hand or automatically as may be desired, I in no way confining myself in this respect. When the bisk tooth has been molded (as described hereinafter) the die member 6 is raised, thereby lifting the tooth and its anchor from the stationary post. The adjustment of the rod 10 vertically is to not only insure the proper projection of the post 12 within the mold space, but where the lower die member 6 is adjusted as to its vertical movement to insure a greater or less quantity of the materials A and B being received in the body member 4 to provide a resulting bisk tooth of greater or less thickness, as required, this rod 10 must be correspondingly adjusted to maintain the proper predetermined depth of embedment of the anchor. The adjustment of the die member 6 is secured by the abutment screw 6ª and the nut, either or both, as desired.

The general operation of the process and machine may now be understood from the following description. Assuming that the process is intended to produce artifical teeth, such as illustrated in Fig. 10, which is to be molded by the cooperation of the members 4, 6, 17 and 19, upon materials A and B supplied by the feeding mechanism 25, and moreover, further provided, if desired, with the anchor 13 in place and an aperture 13ª leading thereto (as indicated in Fig. 10), the following procedure is had. The feeding mechanism 25 supplies the A material through the conduit 26 and aperture 30 into the space within the mold body 4 and above the bottom die member 6, as indicated in Fig. 1. It will be understood, however, that the configuration of the top of the bottom die member 6 and the bottom 20 of the male die member 19 are shaped to correspond to the back and front surfaces of the tooth formation to be produced, and further that the anchor 13 had been placed upon the end of the post 12 of the stationary rod 10, so that the said anchor will be molded within the tooth body. When the space within the die body 4 has been filled, the feeding mechanism 25 is rotated to expose the upper surface of the body 4. Thereupon, the packing or shaping die 17 descends and entering the body member 4, causes the material A therein to be crowded laterally and somewhat packed down upon the lower die member 6, as will be understood by reference to Fig. 5. This provides a space above the material A and within the body member 4 into which material B may be supplied when the shaping or forming die 17 has been raised, and the feeding mechanism 25 given a semi-revolution to bring the orifice 31 over the upper opening into the body member 4, as will be understood by reference to Fig. 6.

During the operation of feeding the B material into the die member 4, the turret frame 15 may be rotated so as to bring the male die 19 into position immediately above the lower die member 6 and the aperture of the body member 4; and as soon as the feeding mechanism 25 has been turned to expose the material contained within the body member 4, the head 14 is depressed with the result that the male die 19 is driven downwardly upon the combined material A and B and compresses it into the condition illustrated in Fig. 5, and as more fully shown in Fig. 10, wherein the A material is compressed to the tooth form A' and the B material compressed to the form B'. The portion A' constitutes the body material of the tooth and is more or less colored to imitate the shading of natural teeth, whereas the portion B' constitutes the front or enamel portion of the tooth covering the body part at the middle portion and extending beyond it at the incisor end. Similarly, the darker or body portion A' of the material extends beyond the enamel portion B' and at the upper or root end of the tooth. The materials composing the parts A' and B' may be of the same general composition, for example, feldspar, kaolin and silex, except for the coloring metallic oxides employed in the two parts for imparting the desired shade. When the compression of the material between the die members 6, 19, is being completed, (Fig. 7), the spool 7 which sustains the lower die member 6 rests directly upon the abutment 2ª of the main frame to provide a firm foundation. When the compression has been completed, the male die member 19 is raised clear of the body member 4 and thereupon the lever mechanism 9 is operated to lift the lower die member 6 to bring the molded tooth to the level of the table 24 and top of the body member 4, as indicated in Fig. 8. When this is done, a blast of air from the nozzle 39 will remove the molded tooth from the dies by blowing it therefrom and into a suitable receptacle. During the raising of the member 6, the molded tooth form with its contained anchor 13 is raised from the stud 12 of the pin 10, so that when the tooth form is fully raised, it will contain the anchor and be provided with the hole 13ª leading thereto, as shown in Fig. 8.

It will be observed from reference to Figs. 3 and 4 that when the materials A and B are introduced within the body member 4, the material A will extend practically for the full area of the lower die 6. It will also be observed from Figs. 7 and 8, that when the die 19 compresses the material, there will be a tendency for the B material at the lower part to crowd the A material to the right and for the A material at the upper portion to crowd the B material to the left, with the result that when the complete compression of the dies takes place, the A material in the part A' will extend to the right of the B material in the part B', and similarly, the B material in the part B' will extend to the left beyond the A material in the part A', as is clearly indicated in Fig. 10. The result of this is that the incisor portion of the tooth has practically little coloring matter associated with it, whereas the root or gum end of the tooth has a pronounced coloring which not only shows directly but also through the finer porcelain facing material B. When the bisk tooth thus formed is vitrified, the coloring matter blends into the porcelain facing portion B', and thereby makes the shading or coloring gradual with the deepest shade at the root or gum end and the lighter shade toward the incisor end.

It will be understood that when the A material is in the body mold and the die 17 descends to slightly compress the said material into the condition indicated in Fig. 5, there will be some tendency to crowd a portion of the material upwardly and laterally upon the upper surface of the body mold part 4, because of the inclined nature of the surface 18 of the die 17. If this occurs, the forward edge 37 of the feeding mechanism 25 will sweep said extruded material over the table and discharge it at 38, as will be more fully understood by reference to Fig. 2.

It is to be understood that while this invention is especially adapted for the molding of artificial teeth in a rapid manner, it is not restricted to that use, as the dies may be made of any shape desired for articles of various forms and which require porcelain or similar materials of different shades. For example, the two characters of material A and B may be employed in connection with die work which would correspond to what are known as "cameos" wherein the relief portion would be of the lighter material B and the body or backing of the darker material A. This reference to other possible uses of the invention will indicate the capacity for various purposes for which the invention may be employed.

This invention, in a generic sense, is intended to cover the process and means for molding a plurality of materials in a more or less powdered form into such relation that they may impart different coloring effects to the unitary articles as molded, whether the said article is subsequently vitrified or not. The invention also extends to and includes the articles produced, that is to say, in a generic sense, a molded article formed of compacted powdered materials, whereby said two characters of materials mechanically unite and overlap, so as to provide the dual colors desired, whether the same is made in the form of an artificial tooth or otherwise, and also including the structure whether it is vitrified or merely hardened under the compression or in any other manner.

While the general character of porcelain composition is well known and it will be understood that any of such compositions may be employed in carrying out my improved process, I will, however, state that for the powdered or granular material constituting the A and B materials of the previous description, the A material may be composed of a mixture of feldspar with kaolin and silex and to which is added a sufficient quantity of metallic oxides to provide the requisite coloring or shading, the same constituting the dark material A' of the object to be produced. On the other hand, the B material which constitutes the light material B' of the object may be of identically the same composition, except so far as the coloring oxides are concerned, which may be omitted, if desired. Aside from the mixtures of these earthy or mineral matters, the powders should be mixed with small quantities of a suitable binder, such as is provided by a solution of gum arabic, sugar water, rosin, wax, dextrin or other equivalent vegetable matter or any mixtures of them desired, so that when the materials A and B are compressed in the dies, they will maintain their shape with sufficient rigidity to be easily handled, and, furthermore, the A and B material will adhere to each other. Before these mixtures are employed in the dies, they are preferably rubbed through a fine sieve so as to be relatively finely divided and of small granular form, permitting easy and satisfactory use in a machine of the character described. It will also be understood that while in the making of artificial teeth the B material will require little or no coloring oxides, nevertheless, in the making of cameos or other ornamental objects suitable coloring matters may be employed with both the light and dark materials in the finished object, and I, therefore, do not limit myself in respect to such admixture.

As it is quite important that the incisor end of the tooth shall have different coloring matter than the body part, I may, as an additional improvement in my invention, provide means for introducing into the mold body at the incisor end of the mold, a small quantity of the B material before the A material is introduced. This preliminary introduction of B material at $B^2$, Figs. 1 and 3, to constitute the $B^3$ part in the tooth (Fig. 10), may be accomplished in the following manner. The die body member 4 is provided with a vertical passage $4^a$ opening at the upper surface of the said body member and at the bottom opening sidewise at $4^b$ through the side wall to the interior of the mold space adjacent to the incisor end thereof. When the feeding mechanism 25 rotates to feed the B material into the interior of the mold space within the body member 4, it also feeds some of the same material into the passage $4^a$ because the orifice 31 is sufficiently wide to permit this action. The feeding orifice 30 for the A material is not wide enough to open into the passage $4^a$ and consequently the A material never enters the said passage. While the B material is delivered both into the mold space of the body member 4 and into the passage $4^a$ at the same time, that which enters the passage $4^a$ is not delivered into the mold space until the next molding operation.

Assuming a tooth has just been molded and ejected and the mold members 4 and 6 are again in position shown in Fig. 1. As the feeding mechanism is then clear of the body member A, the latter is slightly raised by the lever mechanism 5 to bring the latter port 4ᵇ up just enough to discharge some of the B material in the passage 4ᵃ into the mold space immediately above the face of the lower die member 6 and at the lateral end thereof corresponding to the incisor end of the tooth, said deposited material being indicated at B², Figs. 1 and 3. The body member 4 is then lowered to position shown in Figs. 1 and 4. The feeding mechanism 25 is then moved to discharge the A material into the remaining space in the body member as shown. Then the descent of the male shaping die member 17 not only crowds the A material to the right, but shapes the B material at B² also, as shown in Fig. 5. Thereafter, the further quantity of the B material is introduced as in Fig. 5. Thereafter the die 19 is brought into action and completes the compression and the final procedure is the same as before described. The B material of the B′ and B³ parts of the tooth is in effect one body when the full compression has taken place, but I have indicated its location by reference letters in Fig. 8 for better understanding.

It will also be understood that while soldered pin teeth require the anchor 13 to be made a part of the tooth and to which the pin is subsequently soldered, the teeth produced by my improved method and means may have pins directly molded in the teeth and anchors omitted. To secure this result, the upper end of the bottom die member 6 is provided with a shallow hole 13ᵃ, Fig. 9, into which the pin is placed with the head thereof extending upwardly. The molding operation otherwise is the same as before and when the tooth is removed from the dies, the pin is withdrawn with the tooth.

While I prefer that the material introduced into the dies at B² shall be of the same composition as the B material, I do not restrict myself in this respect, as it may be of a slightly more transparent material when vitrified so that the incisor end of frontal teeth may more nearly resemble or simulate the natural teeth.

It is pointed out that while the rod 10 provides the post upon which the anchor 13 is supported within the mold space during the molding operation, and that the said post also acts as a "core" for molding a hole in the back of the tooth or other object, it will be understood that the anchor 13 may be omitted and the end of the rod 10 utilized in merely molding a hole in the tooth or object from the back, such as is common in diathoric teeth.

Considering the broader scope of the invention, it will be understood that I am not confined to the particular method of introducing the materials A and B into the mold space, as said materials A and B (and if desired B²) may be introduced into the mold space, as in Fig. 6, in any manner desired and without use of the forming die 17, relying upon the single action of compression die 19 to compress the layers of the materials A, B and B² as in Fig. 7.

I have more generally referred to the material B being of lighter color than material A, but in making artificial teeth, it sometimes is required that the material B shall be the darker of the two; however, in most instances the B material is quite considerably lighter in color than the A material.

No claim is made in this application to the method employed, as the same forms subject matter of my application Serial Number 537,157, filed February 17, 1922, of which this application is a division.

I have described my improved method and the article of manufacture produced thereby in connection with my improved apparatus which I deem to be best suited to the requirements of the invention and on account of economy is preferred in commercial practice, but I do not restrict or confine myself to the minor or secondary details, either as to the method of procedure or the means employed in putting it into effect, as variations therein may be resorted to as matters for the skilled artisan and without a departure from the spirit of the invention.

Having now described my invention, what I claim as new and desire to secure by Letters Patent is:—

1. Apparatus of the character described, comprising a mold consisting of a relatively stationary annular body member open at top and bottom and upper and lower die members one of which has an upwardly directed molding surface and reciprocates vertically in the body member and the other of which has a downwardly directed molding surface and reciprocates through the upper opening in the body member whereby the two die members cooperate in molding the material between them, means for raising and lowering said die members, a stationary table on a level with the upper surface of the annular body member, and means for successively feeding two kinds of materials in granular or powdered form over the table and into the body member whereby it falls by gravity therein upon the lower vertical die member.

2. The invention according to claim 1, wherein the feeding means consists of a rotating frame having two tubular feeding passages normally sealed by the table except when opening into the top of the body member, means for supplying two kinds of material respectively to the two tubular feeding passages for delivery into the mold body member, and means for imparting a rotary movement to the rotating feeding means.

3. The invention according to claim 1, wherein there is provided a second upper die member for acting upon the material first introduced into the body member to shift and compress it to a lesser degree than the final compression, vertically reciprocating means for simultaneously reciprocating the two upper die members, and means for shifting the two upper die members for bringing them alternately into compressing action with the lower die member and the body member.

4. Apparatus of the character described, comprising a mold consisting of an annular body member and two upper and lower die members therefor, means for raising and lowering said die members, a table on a level with the upper surface of the annular body member, means for successively feeding two kinds of materials in granular or powdered form into the mold body member, an anchor supporting post extending upwardly through the lower die member and extending into the mold space, and means for moving the lower die member upward relatively to the post for raising the molded object clear of the post.

5. Apparatus of the character described, comprising a mold consisting of an annular body member and two upper and lower die members therefor, means for raising and lowering said die members, a table on a level with the upper surface of the annular body member, means for successively feeding two kinds of materials in granular or powdered form into the mold body member, and wherein further the mold body member is provided with a side port, and means for feeding an additional quantity of material through said side port to be molded whereby it is delivered into the mold space immediately at one side and directly upon the lower die member and a relative movement is provided between the said body and lower die member for controlling the opening of said side port.

6. The invention according to claim 5, wherein the side port communicates with a passage extending upward to the top surface thereof, and the means for successively feeding two kinds of material into the mold body member in succession also having provision for feeding one of these materials into the passage in the body member at the same time that it is delivering similar material into the mold space within the body member, and wherein further the lower die member acts as a valve means for controlling the opening and closing of the side port to the interior of the body member.

7. Apparatus of the character described, comprising a mold composed of an annular body member and upper and lower die members, said body member having a lateral port therethrough at a distance from its upper end, means for raising and lowering said die members, and means for feeding materials to be molded through the side port in the body member and also into the upper part of the body member between it and the upper die member.

8. The invention according to claim 7, further characterized by having means for closing the side port in the body member operative to close said side port before the materials are fed into the upper part of the body member and to remain closed at the time the material is compressed between the upper and lower die members.

9. In a machine of the character described, the combination of an annular body part providing a vertical passage through it, a vertically movable lower die member fitting the lower part of the body and adapted to reciprocate vertically therein and having a molding surface on its upper end, an upper die member normally above the body and adapted to be vertically reciprocated downward into the upper end of the passage in the body and having a lower molding surface for directly cooperating with the upper molding surface of the lower die member, and means movable over the upper surface of the body member and between it and the upper die member for delivering into the space within the body member material in a granular or powdered form, whereby said material is supported upon the lower die member and in position to be compressed thereon by the upper die member.

10. The invention according to claim 9, wherein further, there is provided a second upper die member arranged to be vertically reciprocated so as to enter the body passage associated with means for alternately bringing the two upper die members into molding position in respect to the lower die member and the body member, and an additional means is provided for delivering materials in granular or powdered form of a different shade or color into the body member prior to the descent of the last mentioned upper die member, whereby the molded article will be composed of two portions of materials having different color or shade characteristics.

In testimony of which invention, I hereunto set my hand.

ALBERT E. GIBSON.